June 17, 1941.  R. W. SMITH  2,246,417
MEANS FOR BORE HOLE ORIENTING AND SURVEYING
Filed June 18, 1938  3 Sheets—Sheet 1
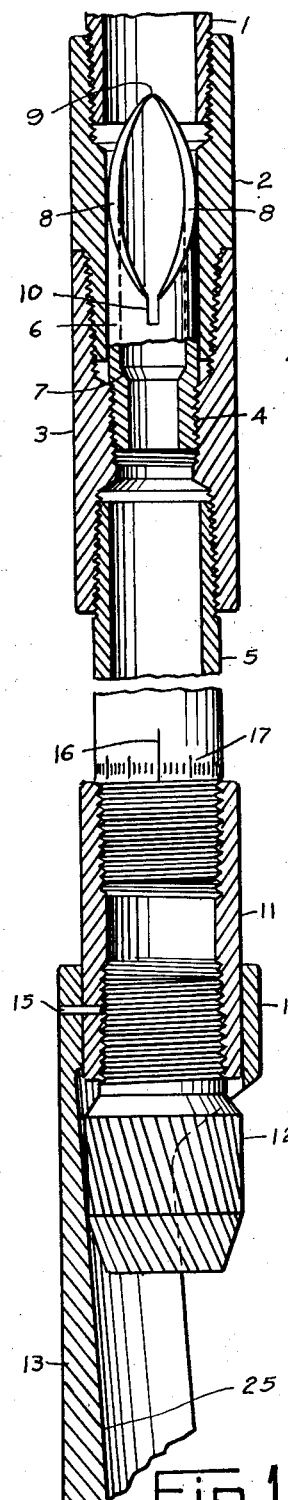
Fig.1.
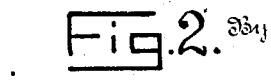
Fig.2.
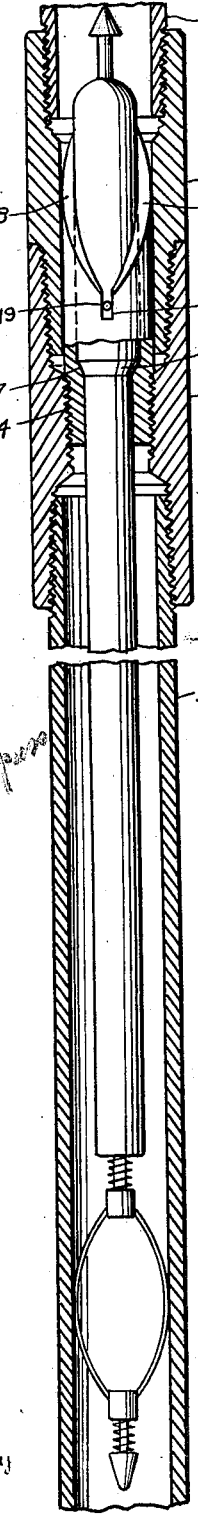
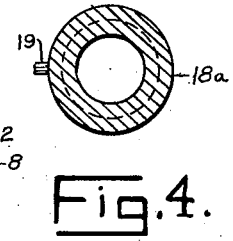
Fig.4.
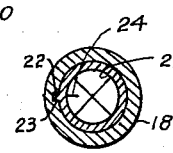
Fig.5.
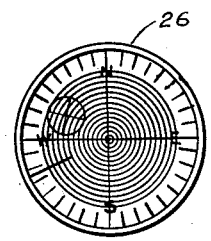
Fig.6.
Fig.3.
Inventor
Ray W. Smith
Edward V. Hardway
Attorney

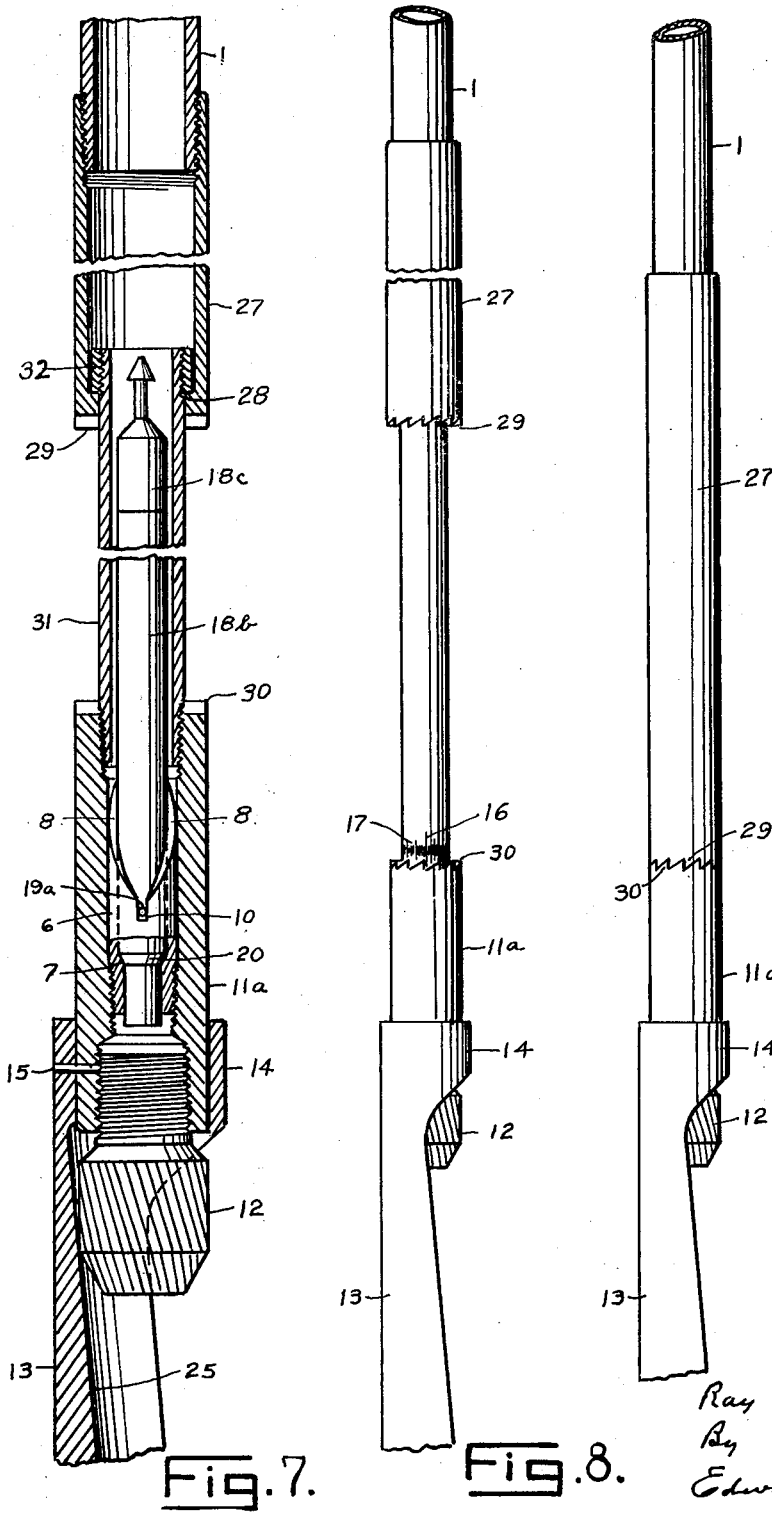

June 17, 1941.   R. W. SMITH   2,246,417
MEANS FOR BORE HOLE ORIENTING AND SURVEYING
Filed June 18, 1938   3 Sheets-Sheet 3

Inventor
Ray W. Smith
Edward J. Hanway
Attorney

Patented June 17, 1941

2,246,417

UNITED STATES PATENT OFFICE 2,246,417

MEANS FOR BORE HOLE ORIENTING AND SURVEYING

Ray W. Smith, Houston, Tex., assignor of one-half to Morris McDannald, Harris County, Tex.

Application June 18, 1938, Serial No. 214,518

4 Claims. (Cl. 255—1)

This invention relates to apparatus and methods for orienting objects in bore holes and also pertains to bore hole surveying apparatus.

An object of the invention is to provide apparatus for accurately orienting any selected type of deflecting tool, or other object, in a well so that the azimuthal position of the tool, or object, in the bore may be selected to give the desired direction to the bore to be formed beneath.

Another object of the invention is to provide apparatus of the character described embodying a deflecting tool, or other equipment, and a surveying instrument associated with the tool, or equipment, and removable to the ground surface for inspection, the parts being so related that the azimuthal position of the deflecting tool, or other equipment, may be readily ascertained upon such inspection.

My present preferred embodiment of the invention involves the use of a tubular driving stem, or drill stem, having a section thereof formed of non-magnetic material to the end that a surveying instrument, embodying a compass, may be located in said section to accurately make a record of the azimuthal position of the drill stem and other pertinent data at any selected elevation.

It is a further object of the invention to provide apparatus of the character specified which in use will offer a minimum of interference with the circulation of the drilling fluid.

Another important object of the invention resides in the provision of apparatus of the character specified wherein provision is made for predetermining the azimuthal position of the surveying instrument with respect to the drill stem or other guide means along which said surveying instrument is lowered into the well.

The invention further embodies a novel method for orienting the deflecting tool in the well bore.

With the above and other objects in view the invention has particular relation to certain novel features of construction, operation and arrangement of parts, and to a novel method, an example of which is given in this specification and illustrated in the accompanying drawings, wherein:

Figure 1 shows a vertical, sectional view of a deflecting tool with the drill stem and drill assembled therewith preparatory to setting the deflecting tool in the well showing also the guide for the outer barrel of the surveying instrument and only a fragmentary view of the deflector being shown.

Figure 2 shows a vertical, sectional view of the outer barrel within which is the surveying instrument, the operative mechanism of which is shown diagrammatically.

Figure 3 shows a fragmentary, sectional view of the drill stem showing said outer barrrel, containing the surveying instrument, located in said stem.

Figure 4 shows a cross-sectional view taken on the line 4—4 of Figure 2.

Figure 5 shows a cross-sectional view taken on the line 5—5 of Figure 2.

Figure 6 shows a plan view of the direction chart.

Figure 7 shows a vertical, sectional view of another embodiment of the invention wherein the drill stem contains a section of non-magnetic metal.

Figure 8 shows a side elevation thereof in non-drilling position.

Figure 9 shows a side view thereof in drilling position.

Figure 10:
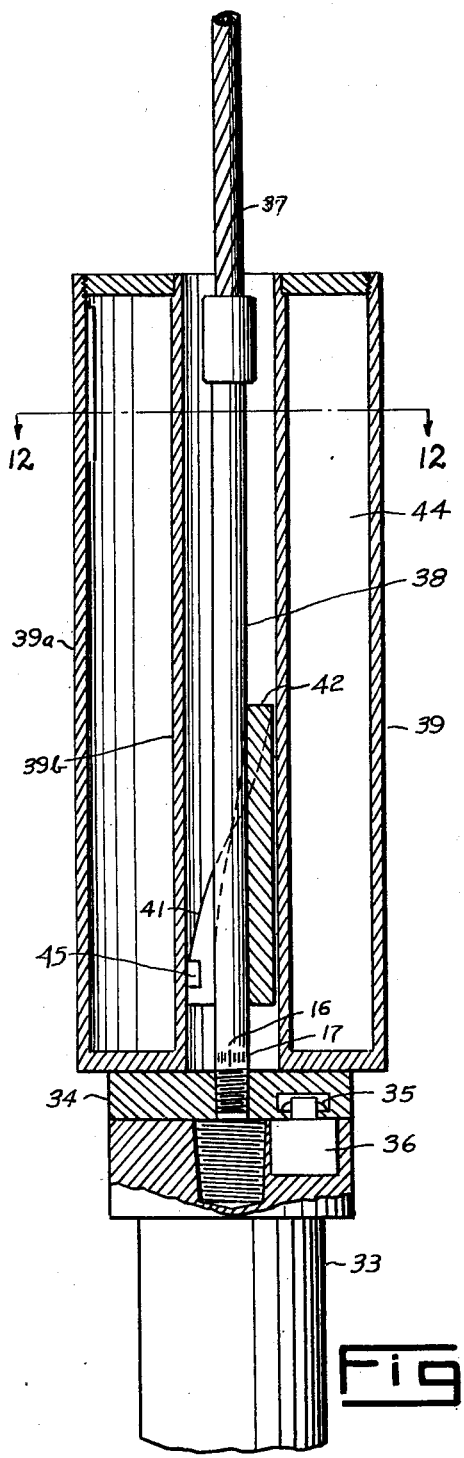
Figure 10 shows a vertical, sectional view illustrating another embodiment of the invention.

Referring now more particularly to the drawings wherein like numerals of reference designate the same parts in each of the figures, the numeral 1 designates the conventional tubular drill stem proper, the lower end of which is connected to the pin member 2 of a conventional tool joint which is screwed into the tool joint box member 3 of conventional construction excepting that it has the internal threads 4. The box member 3 is screwed on to the upper end of the tubular section 5 which is composed of suitable non-magnetic metal and of a length sufficient to locate the compass, hereinafter referrred to, out of the magnetic field of adjacent metal parts. While the non-magnetic section, of the drill stem, is shown located near the lower end of the stem, it is to be noted that it is of the conventional form of drill stem section and consequently may be located any where in the stem—for example, if a survey is desired at some other point in the well bore.

Screwed into the threads 4 there is a tubular guide 6 whose lower end has an inside seat 7. Its upper end is cut on the diagonal thereby forming the declining guide faces 8, 8 whose upper ends terminate at the apex 9 and whose lower ends terminate at the notch 10.

The lower end of the non-magnetic section 5 is screwed into the upper end of a coupling 11 forming a drill collar whose lower end is internally threaded to receive the externally threaded shank of the drilling tool 12 of any selected design.

The numeral 13 designates a deflecting tool. This tool may be a whipstock of conventional construction or any other form of deflecting tool or other appliance. As shown it is provided at its upper end with a sleeve 14 to receive the coupling 11 which coupling is attached to the sleeve so that it may be readily detached, as, for example, by means of a frangible pin 15. Adjacent the upper end of the coupling 11 the section 5 is provided with a mark 16, hereinafter referred to as the zero mark. It is, preferably, aligned with the notch 10. The non-magnetic section 5 is also provided with a degree scale 17 as shown in Figure 1, the zero mark and degree scale being, preferably, located adjacent the upper end of the coupling 11 to prevent the same from becoming worn off.

The numeral 18 designates an outer barrel whose upper end may be closed by a suitable removable cap 18a and whose lower end is also closed. This outer barrel has an external guide pin 19 which, if desired, may be mounted to roll so that it will not hang on the apex 9. When the barrel is dropped through the drill stem 1 the pin 19 will land on the upper end of the guide 6 and will be guided by one or the other of the guide faces 8 into the notch 10, as illustrated in Figure 3. The outer barrel has an external seat 20 thereon arranged to land on the seat 7 before the pin 19 strikes the lower end of the slot 10 so as to prevent the pin 19 from shearing.

The operative mechanism of the surveying instrument is enclosed within a tubular housing 21 which has an external rib 22 thereon. This rib fits into an inside groove 23 in the barrel 18. The groove 23 is, preferably, aligned with the notch 10. The surveying instrument is thus fixed with respect to the outer barrel. The instrument is provided with a pointer 24 which is fixed on the inner barrel relative to the compass 24a and when the parts are assembled, as above described, the pin 19 and pointer 24 are in alignment; or in selected relative positions. The parts of the surveying instrument, where necessary, are made of non-magnetic metal.

With the apparatus thus assembled as the deflecting tool 13 is lowered into the well the relation between the deflecting face 25 of the deflecting tool and the zero mark 16 is noted. The apparatus is then run into the bore in the ordinary way. Upon reaching the bottom the pipe is moved up and down the required number of times to remove the torque and the outer barrel with the surveying instrument therein is dropped or pumped down into the drill stem and when it reaches the non-magnetic section 5 the pin 19 will land on the upper end of the guide 6 and will be guided by one of the faces 8 into the notch 10 with the compass of the surveying instrument located within the non-magnetic section 5 in a non-magnetic field. The pump is then stopped and a picture is taken and the surveying instrument removed by the usual grapple operated by a wire line and the picture as 26 is developed showing the relation of the pointer 24 to the compass and also showing the inclination of the bore. With this direction and inclination known the direction in which the deflecting tool, or other object, is facing, that is its azimuthal relation with the bore, can be readily ascertained. If it is not already facing the desired direction the drill stem may be turned until the tool faces the direction desired. The drill stem may then be lowered shearing the pin 15 and drilling may be resumed in the selected direction.

The above described survey may be repeated, after orienting, for confirmation of the accuracy of orientation. Much time will thus be saved over that required in carrying on orienting methods now commonly used and with greater accuracy for the reason that it will not be necessary to measure the turn of the pipe during introduction into the bore and no angles of sighting at the ground surface will be required. The work can be done with less labor and time, with less danger of accidents for the reason that the service equipment required will be reduced to a minimum. It is to be understood, however, that the surveying instrument may be put into the drill stem before the stem is lowered into the well.

An alternative form of the invention may be employed embodying the same principle as that disclosed in Figures 1 to 6, inclusive. In this embodiment, as shown in Figures 7 to 9, an elongated coupling member 27 is secured to the lower end of the drill stem proper and its lower end is inwardly thickened forming an upwardly facing shoulder 28 and provided with the lower end clutch jaws, or teeth, 29. In this form the coupling or drill collar 11a is extended upwardly and is formed with the clutch jaws, or teeth, 30, the jaws 29, 30 being pitched reversely with respect to each other. In this form the tubular guide 6 has its lower end screwed into the drill collar 11a as shown in Figure 7. It is in all respects similar to the guide 6 shown in Figure 1.

There is a tubular section 31 of suitable length formed of non-magnetic material and attached at its lower end to the upper end of the drill collar 11a. Its upper end telescopes up into the coupling 27 and has the retaining nut 32 screwed on to its upper end within said coupling which is adapted to engage the shoulder 28 to prevent separation of parts.

As illustrated in Figure 7 with the drill stem 1 elevated so as to expose the non-magnetic section 31, the surveying instrument may then be lowered through the drill stem to home position as shown in Figure 7 with the compass thereof located in such position in the non-magnetic section 31 as to be outside of the field of magnetic interference of the metallic parts of the apparatus with the pin 19a located in the notch 10 and the orientation of the deflector is established and other desired surveying data recorded.

The drill stem, of either form, may thereafter be lowered and the pin 15 sheared and drilling proceeded with. In case the form shown in Figures 7–9 is employed the coupling 27 will move down over the magnetic section 31 and the clutch jaws 29 will come into engagement with the clutch jaws 30 as shown in Figure 1 to form an operative connection for thereafter driving the drill 12.

If, while drilling deeper, it should be desired to survey the bore, the surveying instrument may be pumped down through the drill stem to home position as hereinabove explained.

The surveying instrument, it is to be noted, may be of any selected form such, if desired, as hereinabove referred to and shown in Figure 2. Surveys of the bore may thus be made from time to time during drilling operations. However, with the form shown in Figures 7 to 9, inclusive, the drill stem proper 1 should be elevated to the position shown in Figures 7 and 8 before making the survey so that there will be no magnetic interference with the operation of the compass contained in the surveying instrument.

Figure 12:
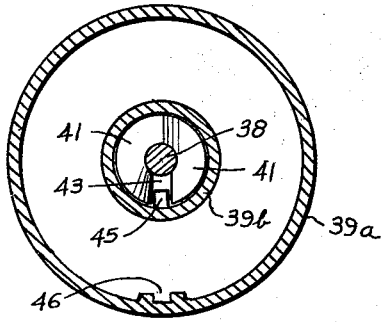
Figure 12 shows a cross-sectional view taken on the line 12—12 of Figure 10.
Figure 11:
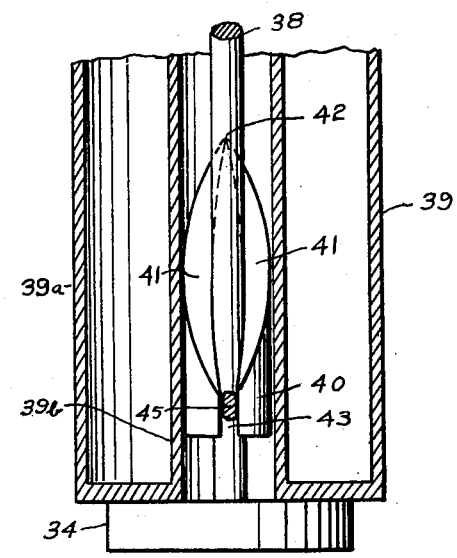
Figure 11 shows a fragmentary, vertical, sectional view taken at right angles to the view shown in Figure 10.

In Figures 10, 11 and 12 another embodiment, illustrating the principle of the invention, is shown wherein the numeral 33 designates any type of equipment to be lowered into a bore hole. On the equipment 33 there is a head 34 which may be latched in place by a latch mechanism 35 releasable by any suitable timing device of conventional construction such as 36. The head may be latched on the equipment 33 and lowered into the bore by means of a cable 37 whose lower end is attached to a rod 38. The lower end of this rod may be screwed into the head 34 as shown. The rod 38 is provided, adjacent the head, with a mark 16 and scale 17 as shown in Figures 1 and 8 for the same purpose. An outer tubular barrel 39 may then be dropped from the ground surface over the cable 37 and will land on the head 34. The rod has a guide 40, analogous to the guide 6. This guide has the sloping guide faces 41, 41 which terminate at their upper ends in an apex 42 and at their lower ends in a slot 43. It will be noted that the outer barrel 39 is formed with the outer and inner concentric walls 39a, 39b providing a chamber 44 between them for containing surveying mechanism similar in construction and mode of operation to that shown in Figure 2 or any other selected type of well surveying mechanism. The inner wall 39b has an inwardly projecting lug 45 which, upon descent of the outer barrel 39, will land on the upper end of the guide 40 and be guided by one or the other faces 41 into the slot 43 as shown in Figure 11 whereby the outer barrel 39 and the surveying mechanism thereon will be located in a predetermined angular relation with respect to the rod 38 and the deflector or other equipment 33. In this instance the picture will be made as hereinabove explained in connection with the form shown in Figures 1, 2, 7 and 8 and upon release of the latch mechanism 35 the surveying instrument together with the head 34 may be withdrawn from the bore and the record inspected and the azimuthal position of the equipment 33 in the bore thus determined. If it be desired to orient it a drill stem or other operating string may be lowered into the well and connected to such deflector 33, or other equipment, and the necessary orientation made. It should be noted that the surveying apparatus should be located in the outer barrel 39 in a selected position therein and for that reason the outer wall 39a is provided with an inside, vertical keyway 46 to receive a key such as 22 shown in Figure 5 and for a similar purpose.

The rod 38 and cable 37 may be of any length relative to each other or either may be used to the exclusion of the other, that is, the rod 38 may extend to the ground surface and both may be either tubular or solid. In either event at least a section of the rod or cable adjacent the surveying instrument should be formed of non-magnetic material in such manner as not to interfere with the operation of the compass forming part of the surveying instrument.

The drawings and description disclose what are now considered to be preferred forms of the invention by way of illustration only, while the broad principle of the invention will be defined by the appended claims.

What I claim is:

1. A tubular drill stem comprising relatively movable parts and embodying a non-magnetic section, said parts being movable into one position to expose said section and into another position to enclose said section and means for clutching said parts for simultaneous rotation when in said last named position.

2. A tubular drill stem comprising relatively movable parts and embodying a non-magnetic section, said parts being movable into one position to expose said section and into another position to enclose said section and means for clutching said parts for simultaneous rotation when in said last named position and a removable well surveying instrument supported by the stem and with a part of said instrument in said section.

3. A drill stem comprising an upper stem section and a lower stem section, a non-magnetic section threaded into one of the stem sections and telescoping with the other stem sections, clutch means formed on the opposing ends of the upper and lower stem sections, guide means positioned in the stem and adapted to position a removable surveying instrument, upon insertion of the instrument into the stem, to a predetermined position with respect to one of the stem sections.

4. A drill stem comprising an upper stem section and a lower stem section, a non-magnetic section threaded into one of the stem sections and slidable in the other stem section, clutch means formed on the opposing ends of the upper and lower stem sections, guide means positioned in the stem and adapted to rotate a removable surveying instrument, upon insertion of the instrument in the stem, to a predetermined position with respect to one of the stem sections, said guide means being adapted to support the instrument.

RAY W. SMITH.